(12) United States Patent
Morgan

(10) Patent No.: US 8,986,415 B2
(45) Date of Patent: Mar. 24, 2015

(54) MEDIA FOR GROWING PLANTS AND THE METHOD OF MANUFACTURE

(75) Inventor: Mofdy Morgan, Gaithersburg, MD (US)

(73) Assignee: Hundz Soil LLC, Gaithersburg, MD (US)

( * ) Notice: Subject to any disclaimer, the term of this patent is extended or adjusted under 35 U.S.C. 154(b) by 1546 days.

(21) Appl. No.: 11/509,034

(22) Filed: Aug. 24, 2006

(65) Prior Publication Data

US 2008/0051286 A1  Feb. 28, 2008

(51) Int. Cl.
| | |
|---|---|
| *C05F 9/02* | (2006.01) |
| *C01C 1/18* | (2006.01) |
| *B01J 19/08* | (2006.01) |
| *C05C 1/02* | (2006.01) |
| *C05C 3/00* | (2006.01) |
| *A01N 25/00* | (2006.01) |
| *A01N 59/02* | (2006.01) |
| *A01N 59/24* | (2006.01) |
| *A01G 31/00* | (2006.01) |

(52) U.S. Cl.
CPC .................................... *A01G 31/001* (2013.01)
USPC .................. 71/1; 71/54; 71/58; 71/59; 71/61; 71/64.03; 71/64.13; 504/188

(58) Field of Classification Search
USPC ........... 71/11, 1, 54, 58, 59, 61, 64.03, 64.13, 71/903; 504/188
See application file for complete search history.

(56) References Cited

U.S. PATENT DOCUMENTS

| | | | | |
|---|---|---|---|---|
| 4,229,202 | A | * | 10/1980 | Mullerheim et al. ................ 71/8 |
| 5,728,192 | A | * | 3/1998 | Andrew, Jr. ....................... 71/26 |
| 6,645,267 | B1 | * | 11/2003 | Dinel ................................ 71/11 |
| 6,877,275 | B2 | | 4/2005 | Glenn et al. |

OTHER PUBLICATIONS

Acid-Wikipedia, the free encyclopedia (Jul. 3, 2014).*
Category: Organic acids-Wikipedia, the free encyclopedia (Jul. 3, 2014).*
Category: Acids-Wikipedia, the free encyclopedia (Jul. 3, 2014).*
Ralph G. Pearson : Hard and Soft Acids and Bases, HSAB, Part I: 1968, 45(9), 581-587.*
Hydroxides-Wikipedia, the free encyclopedia (Jul. 3, 2014).*

* cited by examiner

*Primary Examiner* — Mina Haghighatian
*Assistant Examiner* — Helen Chui
(74) *Attorney, Agent, or Firm* — Barnes & Thornburg LLP

(57) ABSTRACT

The present media is to be used with a particulate base having particles of a first maximum diameter for growing plants. The media includes granules which are of biodegradable recycled material and have a diameter relative to the first maximum diameter to penetrate further into the particulate base with each watering. The granules include plant nutrients and are of a material which coagulates after watering and adheres to the particulates of the base. The diameter of the granules may be in the range of 1/16 to 1/8 of an inch.

18 Claims, 3 Drawing Sheets

SAND

2 WEEKS

6 WEEKS

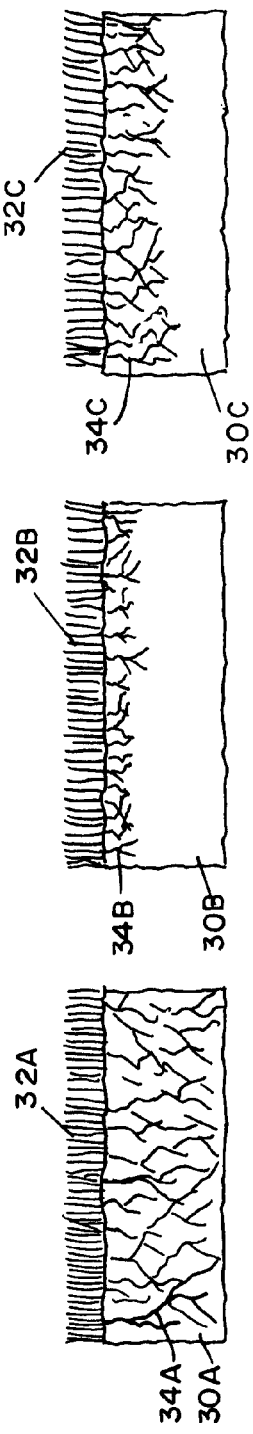
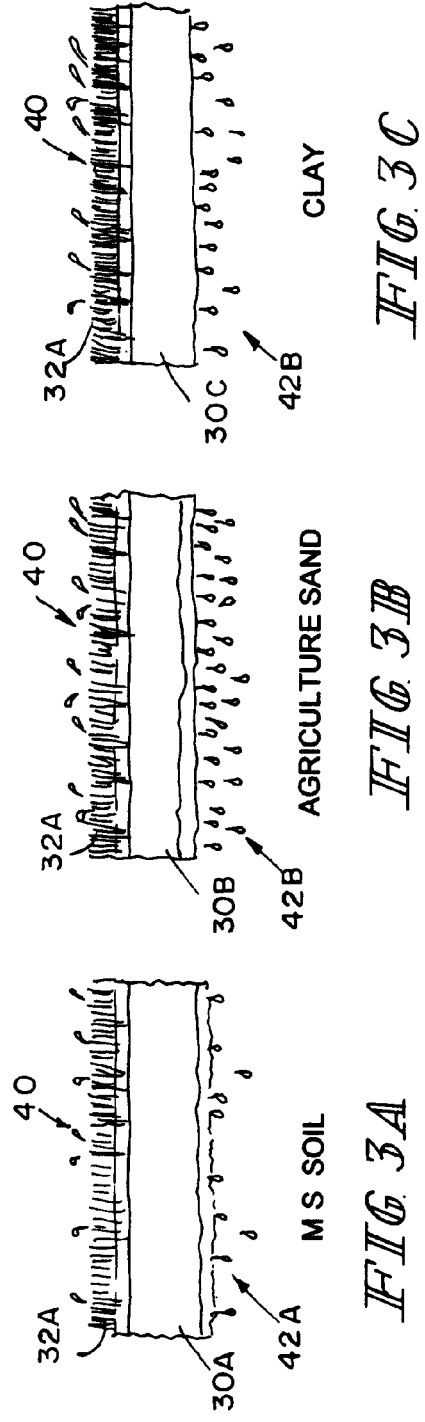

MEDIA FOR GROWING PLANTS AND THE METHOD OF MANUFACTURE

BACKGROUND AND SUMMARY OF THE INVENTION

The present disclosure is directed to a media for growing plants and more specifically, to a media for enhancing the growing of plants in a particulate base.

Soil or another base for which plants are grown is a mixture of differently sized fragments of rocks, minerals, plants and animal debris, organic material mixed with water and decomposed over years and transformed into what is known as conventional soil. At beachfronts or in deserts all of these elements are not present to create the soil which is either stable or have the appropriate nutrients produced by the decomposition of the natural materials which constitute soil.

The use of recycled material to create nutrients for fertilizing for soil is well-known. Mulch, compost or other techniques generally used recycled wood, paper, tree limbs, grass and other vegetable waste. Compost generally has a longitudinal shape in the size of approximately ¼ to ⅛ of an inch. Compost material must be continuously watered to decompose and generally requires up to 21 days. Bacteria, viruses and other pollutants are in the compost since they are required for the decomposition. When the compost is added to the soil or the base material, these bacteria and viruses exist. If the compost or mulch is only placed on the top, it generally absorbs some of the water while allowing some of it to seep through and to wash the bacteria and other pollutants into the soil and ultimately the water table. Mulch and compost offer some degree of a barrier for evaporation of the moisture from the soil. The compost is introduced into the soil by mechanical or manual processing with a hoe, rake or other tools. While providing nutrients, compost does not necessarily bond with or adhere to a granular base such as sand or sandy soil. Thus the stability of the sand or a particulate base is a function of the root system of the product therein.

The present media is used with a particulate base which addresses all the problems related to compost, mulch and other prior soil enrichment products.

The present media is to be used with a particulate base having particles of a first maximum diameter for growing plants. The media includes granules which are of biodegradable recycled material and have a diameter relative to the first maximum diameter to penetrate further into the particulate base with each watering. The granules include plant nutrients and are of a material which coagulates after watering and adheres to the particulates of the base. The diameter of the granules may be in the range of 1/16 to ⅛ of an inch.

A method of treating a particulate base having particles of a first maximum diameter for growing plants includes applying a media of granules having a diameter in the range of the first maximum diameter onto the particulate base; and repeatedly watering the media on the particulate base to allow the granules to penetrate further into the particulate base with each watering. The granules are of a material which coagulates to stabilize the particulate base between waterings and/or retain the water during waterings.

A method, of preparing the present media to be used with a particulate base having particles of a first maximum diameter for growing plants, includes reducing a starting material to particles of a size below a second maximum dimension; dividing the particles into first and second groups; and treating the first group with a first solution and the second group with a second solution different that the first solution which breaks down the particles. The two groups of broken down particles are combined and the two solutions are allowed to chemically react and produce a mass of particles which are conducive to plant growth. The mass granulated into granules of a diameter below the second maximum diameter as the media.

The second maximum dimension may be 0.5 inches and the third maximum diameter of the granules may be below 0.25 inches. The diameter of the granules maybe in the range of 1/16 to ⅛ of an inch. If the starting material is biodegradable recycled material, the granules are sanitized, for example, by ultra violate radiation. The particles may also be washed before treating. The first solution may be potassium hydroxide and the second solution may be nitric acid.

BRIEF SUMMARY OF THE DRAWINGS

FIGS. 2A through 2C are cross-sectional representations of the root system of media treated sandy soil, sand and clay soil, respectively.

FIGS. 3A through 3C are cross-sectional representations of water absorption of media treated sandy soil, agricultural sand soil and clay soil, respectively.

DETAILED DESCRIPTION OF THE PREFERRED EMBODIMENT

Figure 1A:
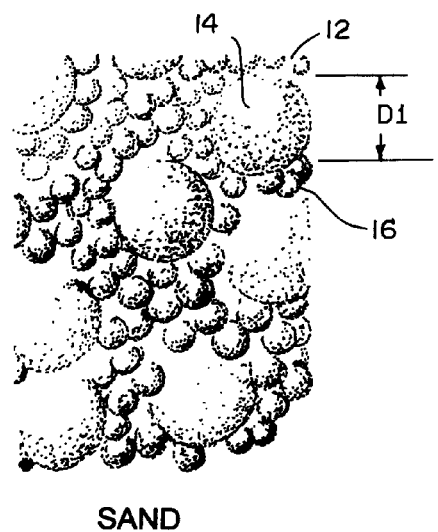
FIGS. 1A through 1C are graphic representations of a sand particulate base before the application of the present media, two weeks after the application of the present media and watering and six weeks after application of the present media and watering, respectfully.
Figure 1B:
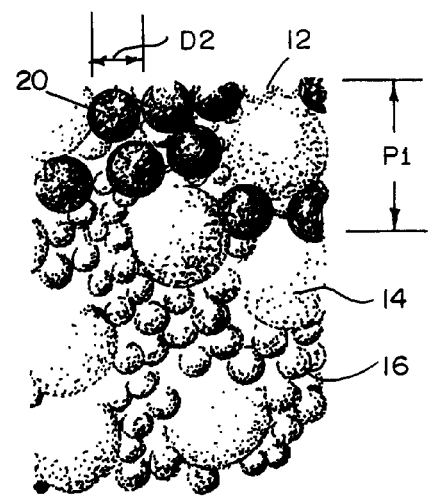

A particulate base 10 illustrated in FIG. 1 includes a top surface 12 and particles 14 and 16. Particle 14 being represented as the largest particle in the sand base 10 having a diameter D1. As illustrated in FIG. 1B, the present granular media 20 has a diameter D2. The diameter D2 is shown on the range of the maximum diameter D1 of the largest particle 14 in the particulate base 10. Please note that sand is being described as particulate base 10, but any particulate bases maybe used which require enrichment and stabilization for the growth of plants. It should also be noted that the plants include grass, flowers, trees, bushes, vegetables, etc. The granular media 20 includes nutrients to enhance the growth of the plants in the particulate base 10.

Figure 1C:
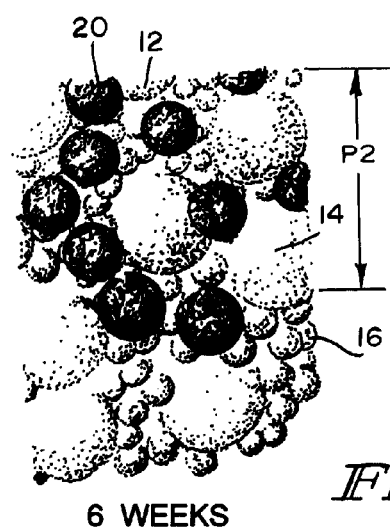

The specific diameter D2 of the granules are in the range of the maximum particle D1 to allow it to penetrate from the surface 12 into the particulate base 10 without any mechanical or manual activity. The granular media 20 are applied to surface 12 and watered. After two weeks, the granular media 20 penetrates to a depth of P1, as shown in FIG. 1B. This may be, for example, ⅜ of an inch. After daily watering, the granular media 20 continues to penetrate further from the surface 12 into the particulate base 10. As illustrated in FIG. 1C, after six weeks it has a depth of penetration of P2. P2 has been shown to be, for example, ¾ of an inch. The structure of the granular media 20 is such that after each watering and penetration, it coagulates and adheres to and stabilizes the particles 14 and 16 of the particulate base 10. The movement or growth of the roots also displace the sand particle and granular media and allows further penetration of the granular media. This by itself prevents erosion by wind or other water of the particulate base 10 and provides a stabilized base.

For the experiments conducted to date, it has been found that the particulate size is preferable to be in the range of 1/16 to ⅛ of an inch. Also a substantially round shape versus an elongated shape is also preferred. Diameter D1 of the particle 14 of particulate base 10 may be in the range of 1/32 to 1/16 of an inch. As the particle size of the particulate base 10 decreases, less of the granular media 20 is needed since more particulate would adhere to the granules. As the size of the particulate base 10 increases more of the product is needed so that there is an appropriate adhesion to the larger size particles of the particulate base 10.

Comparison of the root system is graphically illustrated in FIGS. 2A through 2C. The soil in 2A is a media induced sandy soil 30A with the plants 32A grown thereon with a root system 34A. In FIG. 2B, the soil is sand or agricultural sand soil 30B having plants 32B and root system 34B. In FIG. 2C the base is clay 30C, the plants are 32C and the root system is 34C. The plants 32A in the media sandy soil of FIG. 2A are substantially thicker than that in FIGS. 2B and 2C for sand and clay, respectfully. Also, the root system substantially denser in lateral expansion as well as depth. This results because of the natural penetration of the granular media 20 into the soil providing nutrients at a lower level. Also the nutrients are provided in a greater concentration throughout the media sandy soil 30A. Water retention will be discussed with respect to FIGS. 3A through 3C.

As illustrated in FIGS. 3A through 3C the water 40 from daily watering produces a different amount of runoff or flow through to a water table 42A, B and C for FIGS. 3A, 3B, and 3C. The amount of runoff 42A of the media sandy soil 30A is substantially less than the runoff 42B of the agricultural sand 30B and the runoff 42C of the clay soil 30C. The media sandy soil 30A has a greater retention of the water. This would reduce the amount of watering needed since very little of it would seep through into the water table.

Figure 4:
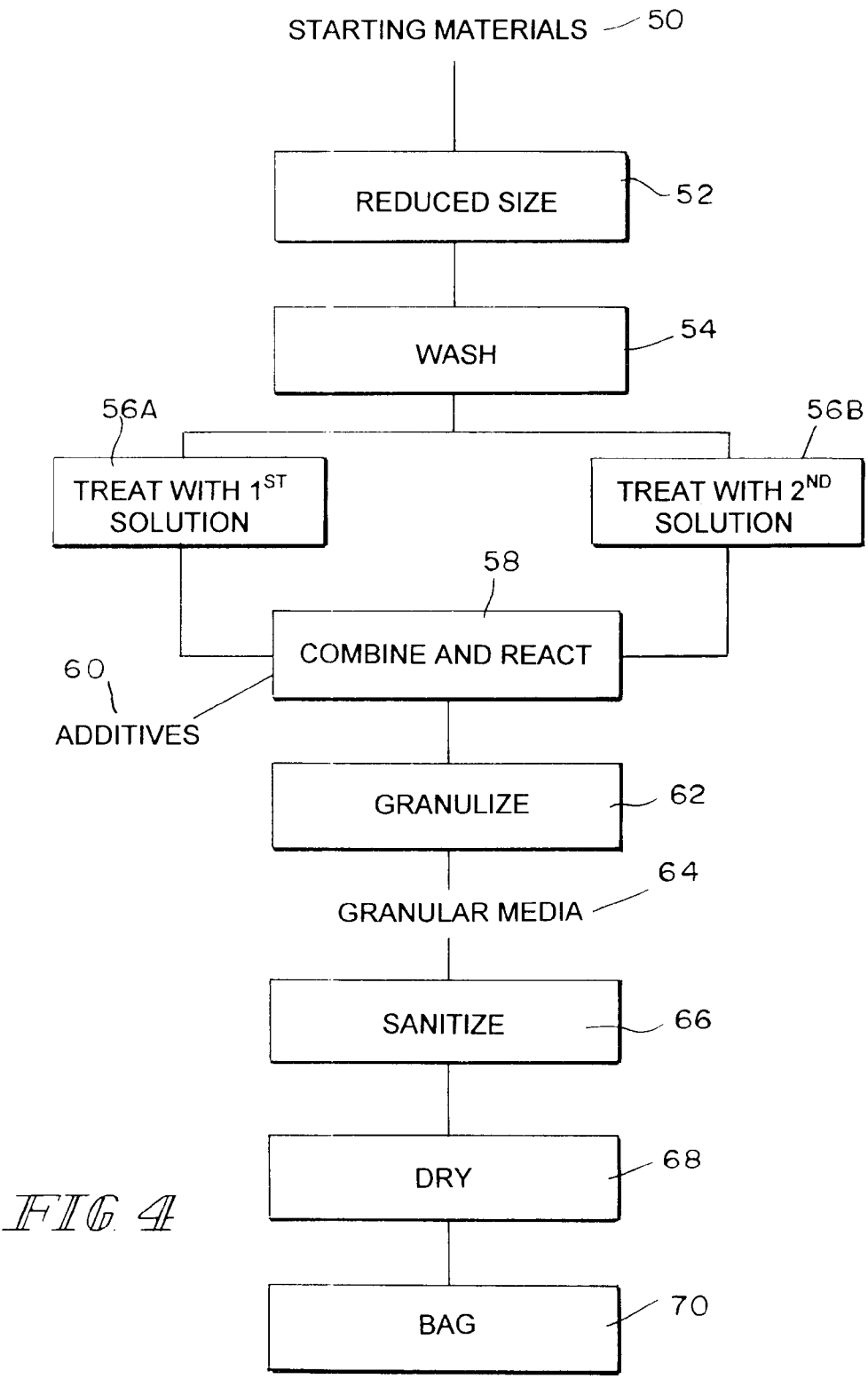
FIG. 4 is a flowchart of the method of producing the present media.

The process for creating the granular media 20 of the present media is illustrated in FIG. 4. Starting material 50 which may be recyclable biodegradable material, for example, wood, paper, tree limbs, grass or other vegetable matter. The starting material 50 is reduced in size by step 52. This may be by mechanical methods including grinding and crushing. The maximum dimension of the first reduction step 52 should be less than half an inch. This may be a two-step process. The first crushing and grinding may reduce the initial size of recycled material 50 to 3/8 to 3/4 of an inch. A second grinding stage reduces the particle size to 1/8 to 3/16 of an inch. Next the reduced sized particles are then washed step 54. This is an initial cleansing operation of the recycled materials.

The washed materials are then divided into two lines. Half of the batch is treated with a first solution at 56A and the second half is treated with a second solution 56B. The materials are combined and react at step 58. The solutions are substantially absorbed into the materials. The combined material are stirred by a mixer. Additives 60 may be introduced at this stage depending upon the particular application. For example, calcium sulfite may be added to reduce the salinity of the particulate base 10. This may also be additional nutrients or fertilizer.

As an example, the first solution of step 56A may be potassium hydroxide and the second solution at step 56B may be nitric acid. When they are combined and allowed to react at step 58, they produce water and potassium nitrate which is a fertilizer. The chemicals are selected to breakdown the initial recyclable material chemically versus the decomposition as in compost or mulch. The production of a fertilizer is a byproduct of the process, but not a necessity. The importance is that the two strong solutions, used to breakdown the reduced size starting material 50 into a paste, when combined produce a neutral or ecologically friendly product.

The chemical treatment and reaction produces a paste or dough-type material and the product of step 58 is then granulized at step 62. The granules have a diameter below 1/4 inch and preferably in the range of 1/16 to 1/8 of an inch. This results in the granular media 64.

Additionally to prevent any bacteria or viruses from entering the water table, a sanitation process performed at step 66. The sanitation step 66 may be by well-known methods, for example, ultra-violet radiation. The granules are dried at step 68 and bagged at step 70.

The method of FIG. 4 has been mechanized using conveyers in various stations to perform the various steps. A typical throughput requires only about ten minutes. This is substantial reduction in time compared to the preparation of compost which is 21 days involving natural decomposition. As previously discussed the granular media provides the required nutrients and base for the growth of the plants. It has a greater absorption of moisture to then previous products. It's adhesion to the particulate base offers stability to the base as well as water retention. With continual watering, the particulates penetrate further into the soil thereby increasing the root growth and the density of the plants. The stabilization of the base with the increased water retention, prevents undesirable material reaching the water table.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A method of preparing a media to be used with a particulate base having base particles of a first maximum diameter for growing plants, the method comprising:
   reducing a starting material to media particles of a size below a second maximum diameter which is in the range of the first maximum diameter;
   dividing the media particles into first and second groups;
   treating the first group with a first solution and the second group with a second solution different than the first solution both of which break down the media particles in its group;
   combining the two groups of broken down media particles and allowing the two solutions to chemically react and produce a mass of particles which are conductive to plant growth;
   granulate the mass of particles into granules of a third maximum diameter below the second maximum diameter as the media; and
   wherein the first solution is potassium hydroxide and the second solution is nitric acid.

2. The method according to claim 1, wherein the second maximum diameter is 0.5 inches and the third maximum diameter of the granules is below 0.25 inches.

3. The method according to claim 1, wherein the diameter of the granules is in the range of 1/16 to 1/8 of an inch.

4. The method according to claim 1, wherein the starting material is biodegradable recycled material and further including the step of sanitizing the granules.

5. The method according to claim 4, wherein the granules are sanitized using ultra violate radiation.

6. The method according to claim 4, further including washing the media particles before the treating step.

7. The method according to claim 1, wherein the mass of particles are free of ecologically damaging containments.

8. The method according to claim 1, further adding fertilizer to the mass of particles.

9. The method according to claim 1, including adding nutrients to the mass of particles for a plant.

10. The method according to claim 1, further including drying the granules.

11. The method according to claim 1, further adding calcium sulfate to the mass of particles.

12. The method according to claim 1, wherein the starting material is biodegradable.

13. A method of preparing a media to be used with a particulate base comprising:
   reducing a starting material of vegetable matter to media particles of a diameter in the range of about 3/8 to 3/4 inches;
   dividing the media particles into first and second groups;
   treating the first group with a solution of potassium hydroxide and the second group with an a solution of acid both of which break down the media particles in its group;
   combining the two groups of broken down media particles and allowing the two solutions to chemically react and produce a mass of particles which are conductive to plant growth; and
   granulating the mass of particles into granules of a diameter between about 1/16 to 1/4 inches,
   wherein the acid is nitric acid.

14. The method according to claim 13, further comprising the step of adding fertilizer to the mass of particles.

15. The method according to claim 13, further comprising the step of drying the granules.

16. The method according to claim 13, further comprising the step of sanitizing the granules.

17. A method of preparing a media to be used with a particulate base comprising:
   reducing a starting material of vegetable matter to media particles of a diameter in the range of about 3/8 to 3/4 inches;
   washing the media particles;
   dividing the washed media particles into first and second groups;
   treating the first group with a solution of potassium hydroxide and the second group with a solution of nitric acid whereby the first and second groups are broken down by the treating;
   combining the two groups of broken down media particles and allowing the two solutions to chemically react and produce a mass of particles which are conducive to plant growth;
   granulating the mass of particles into granules of a diameter between about 1/16 to 1/4 inches;
   sanitizing the granules using radiation;
   drying the granules,
   applying the granules to the particulate base, and
   watering the base whereby the granules will penetrate into the particulate base.

18. The method according to claim 17, wherein the combining step forms a paste of the media particles.

* * * * *